(12) United States Patent
Guy et al.

(10) Patent No.: US 6,785,662 B1
(45) Date of Patent: Aug. 31, 2004

(54) REFINERY SCHEDULING OF INCOMING CRUDE OIL USING A GENETIC ALGORITHM

(75) Inventors: R. Kirk Guy, Houston, TX (US); E. Cole Nelson, Jr., Crystal Lake, IL (US)

(73) Assignee: UOP LLC, Des Plaines, IL (US)

( * ) Notice: Subject to any disclaimer, the term of this patent is extended or adjusted under 35 U.S.C. 154(b) by 322 days.

(21) Appl. No.: 10/116,617

(22) Filed: Apr. 3, 2002

Related U.S. Application Data
(60) Provisional application No. 60/289,022, filed on May 4, 2001.

(51) Int. Cl.[7] .............................................. G06F 15/18
(52) U.S. Cl. ........................................................ 706/13
(58) Field of Search ............................. 706/13; 702/13

(56) References Cited

U.S. PATENT DOCUMENTS

| | | | |
|---|---|---|---|
| 5,255,345 A | | 10/1993 | Shaefer ........................ 706/13 |
| 5,541,848 A | | 7/1996 | McCormack et al. ........ 700/213 |
| 5,581,657 A | | 12/1996 | Lyon ............................ 706/13 |
| 5,848,403 A | | 12/1998 | Gabriner et al. .............. 706/13 |
| 5,897,629 A | | 4/1999 | Shinagawa et al. ........... 706/13 |
| 5,924,048 A | * | 7/1999 | McCormack et al. ......... 702/13 |
| 6,002,985 A | | 12/1999 | Stephenson ................... 702/13 |
| 6,236,894 B1 | * | 5/2001 | Stoisits et al. ................ 700/28 |
| 6,446,721 B2 | * | 9/2002 | Patel et al. ............... 166/252.1 |

OTHER PUBLICATIONS

Leung et al, "A genetic Algorithm for Mulitple Destiniation Routing Problems", IEEE Transactions on Evolutionary Computing, Nov. 1998.*

Oaks et al, "Generation of Realistic Air Traffic Scenarios Using a Genetic Alogrithm" IEEE proceedings of DAS conference, 2002.*

Tawanaka et al, "Genetic Algorithm with the Constraints for Nurse Scheduling problem" IEEE on Evolutionary Computing, May 2001.*

Andrzej et al, "A New Costraint Tournament Selection Method for Multi criteria Optimization using Genetic Algorithm" IEEE on Evolutionary Computing, Jul. 2000.*

Lee, H. Pinto, J.M.; Grossman, I.E; Park, S.; *Ind. Eng. Chem. Res.*, 35, 5 1996 pp. 1630–1641.

Barsamian, A; "Genetic Algorithm Optimizers for Blend Planning Applications"; Refinery Automation Institute, LLC.

*Hydrocarbon Processing*, Sep. 2001, 119.

* cited by examiner

*Primary Examiner*—George B. Davis
(74) *Attorney, Agent, or Firm*—John G. Tolomei; Frank S. Molinaro; Maryann Maas

(57) ABSTRACT

A method of forming a schedule of crude oil shipments being received at a refinery facility using a genetic algorithm has been developed. A period of time, T, within which the crude oil shipment schedule is to be formed is determined. A first generation of chromosomes is generated and a fitness function value calculated for each chromosome. A succeeding generation of chromosomes is created using a genetic algorithm and the fitness function value for each chromosome is determined. The steps of producing a succeeding generation of chromosomes using a genetic algorithm and determining a fitness function value for each chromosome are repeated for time T. The chromosome having the highest fitness function value within time T is identified to generate the schedule.

4 Claims, 1 Drawing Sheet

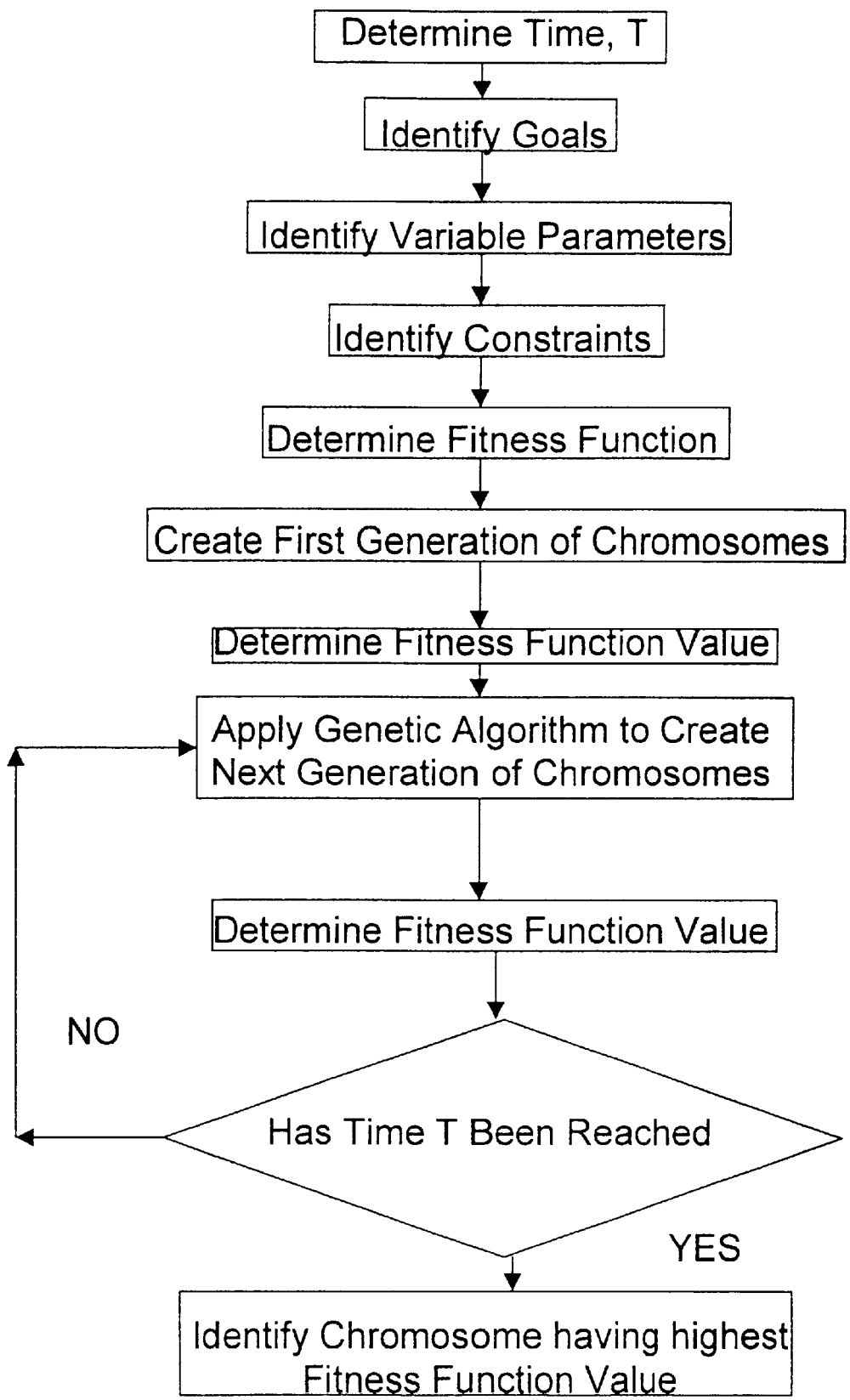

REFINERY SCHEDULING OF INCOMING CRUDE OIL USING A GENETIC ALGORITHM

CROSS-REFERENCE TO RELATED APPLICATION

This application claims priority from copending Provisional Application No. 60/289,022, filed May 4, 2001, which is hereby incorporated by reference in its entirety.

FIELD OF THE INVENTION

The general field of the invention is in scheduling; specifically, a genetic algorithm is used to optimize the scheduling of crude oil vessels arriving at a refinery, unloading of the crude oil, and transfer of the crude oil to a storage tank.

BACKGROUND OF THE INVENTION

A refinery that processes crude oil is faced with the ongoing problem of continually scheduling the delivery, unloading, and temporary storage of crude oil. Usually the delivery of the crude oil is by a water-craft such as oil tankers or by pipeline. The vessels carrying the crude oil must be docked, usually at refinery facilities, and the crude oil unloaded and transferred through a conduit system to storage tanks. Each vessel has an arrival date, a specified number of days for unloading, and a demurrage charge if the unloading period is extended. Furthermore, each vessel may be of a different size and carrying a different amount of crude oil, and the composition of the crude oil itself varies from vessel to vessel. The refinery schedule is further defined by the number of available berths in the harbor or dock for the vessels, the size of the berths and the transportation conduits and equipment available at each of the berths. When the crude oil is delivered primarily by pipeline, sufficient temporary storage must be available at the time the crude oil arrives at the destination. It is common for refineries close to main waterways to primarily rely on vessels to deliver crude oil, and for refineries inland to rely on pipelines. Of course, a number of refineries have both vessel delivery of crude oil as well as pipeline delivery of crude oil.

Others have attempted to solve refinery scheduling problems using processes involving linear programming algorithms, see Lee, H. Pinto, J. M.; Grossmann, I. E. Park, S. Ind. Eng. Chem. Res. 35, 5, 1996 p. 1630–1641. In this article, the problem to be solved involved optimal operation of crude oil unloading, the transfer of the crude oil from storage tanks to charging tanks, and the charging schedule for each crude distillation unit. To optimize this operation, a mixed-integer optimization model was used which relied on time discretization. The problem involved bilinear equations due to mixing operations, However, the linearity in the form of a mixed-integer program was maintained by replacing the bilinear terms with individual component flows. The linear programming based branch and bound method was applied to solve the model and several techniques such as priority branching and bounding and special ordered sets were implemented to reduce computation time.

In the coal industry, U.S. Pat. No. 5,541,848 B1 describes a method of scheduling the delivery of coal to a series of incoming coal trains using a genetic algorithm where each of the coal trains corresponds to a coal recipient having different premium and penalty rates for energy yield, and contaminate specifications. The method is applied to a coal facility having a plurality of bins where the coal is of varying quality at the various bins and where the bins are grouped so that loading into trains must be done in succession.

Genetic algorithms such as that described in U.S. Pat. No. 5,541,848 B1 are known and multiple specific variations exist, see for example, U.S. Pat. No. 5,255,345 B1, U.S. Pat. No. 5,897,629 B1, U.S. Pat. No. 5,581,657 B1, and U.S. Pat. No. 5,848,403 B1. Genetic algorithms have been employed in a number of applications such as in U.S. Pat. No. 6,002,985 B1 which describes managing the development of oil or gas reserves using a neural network and genetic algorithm program to define a neural network topology. Drilling, completion, and stimulation of the reservoir is determined and applied based on hypothetical alternatives input to the topology and resulting outputs.

In the present invention, refinery scheduling problems dealing with incoming crude oil are at least semi-optimized using a genetic algorithm to arrive at a suitable feasible solution within a relatively short period of time. The use of genetic algorithms allows for acceptable solutions to be generated in the typical time frame available to a refiner. Changes in variables may be incorporated and the schedules re-optimized in a timely fashion.

SUMMARY OF THE INVENTION

The present invention is a method of forming a schedule of crude oil shipments being received at a refinery facility. The method begins by determining a period of time, T, within which the crude oil shipment schedule is to be formed. Then the goals of the crude oil shipment schedule, the variable parameters associated with the crude oil shipments to the refinery facility, and the constraints associated with the crude oil shipments to the refinery facility are all identified. A fitness function is determined in accordance with the goals of the schedule, the variable parameters, and the constraints. A first generation of chromosomes is randomly generated, with each chromosome in the generation representing a possible solution. The fitness function value for each of the chromosomes is calculated using the fitness function. A succeeding generation of chromosomes is created using a genetic algorithm and the fitness function value for each of the chromosomes is determined using the fitness function. The steps of producing a succeeding generation of chromosomes using a genetic algorithms and determining a fitness function value for each of the chromosomes in the succeeding generation are repeated. The chromosome having the highest fitness function value within time T is identified.

BRIEF DESCRIPTION OF THE DRAWING

FIG. 1 presents a block diagram representing the procedure of the invention.

DETAILED DESCRIPTION OF THE INVENTION

The overall process of bringing crude oil into a refinery may be summarized in general terms as follows. Many refineries are located near major water ways so that crude oil may be transported to the refinery in large volumes by ship or oil tankers. The term "vessel" as used herein is meant to refer to the water crafts used for transporting crude oil to a refinery. The size of the vessels may vary widely and can carry a large range of quantities of crude oil. Often, the refinery has a harbor, piers, wharf, anchorage facilities or the like, with one or more mooring stations for the crude oil-carrying vessels to dock. At least one, and often a network of conduits are present along with pumping means, to transport the crude oil from the docked vessel to a storage facility. Some storage facilities are comprised of one or more above ground storage tanks, but other storage facilities may be employed. The storage facility may be located near to the mooring stations of the vessel, or may be some distance away.

Crude oil may also be delivered to the refinery via pipeline. Refineries that are not located near to major water ways may rely on pipeline transportation of the crude oil. Some refineries use both mechanisms for delivery of crude oil, pipeline delivery as well as vessel delivery. When the crude oil is delivered via a pipeline, a refiner must be able to immediately use the crude oil or must have facilities available to store the crude oil. Unlike a shipping vessel which, although is costly, may be kept waiting for a short period of time to unload the crude oil, a pipeline delivery must be accepted virtually immediately.

A refiner must coordinate how much and what type of crude oil is needed, with the amount of crude oil in storage and the amount of crude oil being transported to the refinery. The refiner must schedule deliveries of crude oil in accordance with the anticipated needs of the refinery so that a supply of the right type of crude oil is available at the time that it is needed in the refinery. However, it is advantageous for a refiner to also schedule deliveries of crude oil in a way that minimizes the costs incurred by the refiner. Therefore, a significant number of factors need to be considered when optimizing the scheduling of crude oil coming into a refinery. First, the type of transportation is a factor, by vessel, by pipeline, or both.

If vessels are used for transportation, the specifics of the vessels transporting the crude oil must be considered. The size of the vessel, the amount and type of crude oil being transported by the vessel, the date of arrival of the vessel, the number of days the vessel may be harbored, the demurrage charge of the vessel and how the demurrage is calculated all must be considered. Next, the facilities of the refiner are considered. For example, how many mooring stations are available, the size of vessel that may be accommodated at each mooring station, and the type of off-loading equipment available at each mooring station, are all factors that may be considered. Similarly, the network of conduits for transporting the crude oil from the vessel to a storage tank is considered. Each mooring station my be equipped with a specific size and type of conduit with a maximum pump rate which may then connect to a matrix of conduits of varying sizes and types. Depending upon the particular conduits selected for use from the matrix, the crude oil may be transported to a number of different locations for temporary storage. Finally, the storage tanks are considered. The overall volume of the storage tanks as well as the current available volume are considered. The composition of any crude oil already in the storage tanks are also a factor for consideration.

If a pipeline is being used, the delivery date of the crude oil, the type of crude oil, and the flow rate of the crude oil must be considered. The storage facilities of the refiner also must be a factor as described above. If both vessel and a pipeline are being employed by the refiner for the delivery of crude oil, all of the above factors are to be considered.

It is the goal of the refiner to consider the above factors and optimize the schedule of crude oil-bearing vessels to maximize efficiency, product value, and minimize costs. One known way refiners have optimized crude unloading and inventory management has been through using linear programming and mixed integer linear programming. There are many benefits of using linear programming algorithms, the solution is global and represents the optimum solution. However, a major drawback in using linear programming for a refiner is the length of time that may be necessary for the linear programming algorithm to reach convergence and provide the optimum solution. In fact, in complex problems, it is possible that the linear programming algorithm will not find a solution at all.

Frequently, a refiner has a relatively short period of time to devise a schedule for the delivery of crude oil, especially when an existing schedule changes and new values for one or more variables need to be incorporated quickly. The present invention, provides a schedule or a revised schedule to a refiner in a reasonable time frame by using a genetic algorithm. While the genetic algorithm may not provide a global solution, and may not provide the best solution theoretically possible, the genetic algorithm method of the present invention will provide a feasible semi-optimized solution in a reasonable time frame.

Genetic algorithms were introduced in 1975 by John Holland as a method for finding an optimum solution to complicated problems, John H. Holland, "Adaptation in Natural and Artificial Systems," University of Michigan Press, 1975; Second edition: MIT Press, 1992. For example, the genetic algorithm is a useful method for finding optimum solutions to the Traveling Salesman Problem described by Grefenstette. In the genetic algorithm, an emulated chromosomal data structure is initially designed to represent a candidate or trial solution. A plurality of n-bit chromosomes of that data structure are then randomly generated. A plurality of generated chromosomes are registered in groups or populations. A plurality of parent chromosomes are selected from this population of generated chromosomes according to a given algorithm. Each generated chromosome is assigned a unique problem-specific fitness which differs from other chromosomes in the population identifying a solution quality of the chromosome. The problem-specific fitness is expressed by a fitness value. Chromosomes are selected from the population of chromosomes in proportion to their fitness values with more-fit chromosomes having higher probability of being selected. When a pair of parent chromosomes are selected from the population, the parent chromosomes are combined with a probabilistically generated cutpoint. In the case of having no cutpoint generated, either of the parent chromosomes is simply copied to provide a new chromosome as a child chromosome. Thus, a child chromosome is created and outputted. The child chromosome therefore contains portions of each parent or the whole portion of a parent. The child chromosome is then mutated. The mutation is performed with a low probability. The mutation is performed through inversion of a bit in the child chromosome. A mutated child chromosome is then evaluated to be assigned its fitness value. An evaluated child chromosome along with its fitness value is stored as a member of the next generation in the population. After repeated iteration of this process, the general fitness of chromosomes in the population improves. Thus, a solution to the problem emerges in the population. A solution to the problem is acquired with highly fit chromosomes concentrated in the population.

The present invention employs the known genetic algorithm technique to the problem faced by a refiner in scheduling crude oil deliveries, transfers, and storage. In a typical situation, a refiner must contract to purchase crude oil well in advance of the delivery. For purposes of explanation only, a sixty days advance purchase will be used as an example. At this point, the quantity, the price of the crude, and the mode of transportation may all become fixed. A tentative delivery date may be set. If the crude oil is to be transported by pipeline, the delivery date may be fairly firm. However, if the crude oil is to be transported by vessel, the delivery date may be affected by the weather, mechanical problems of the vessel, labor situations, international regulations, and other unpredictable events. The type of crude oil may change from what was available at the time of the sale to what is available at the time of shipment. The purchase process may be repeated several times with various suppliers. Based on his experience, a refiner may manually generate an initial delivery schedule.

The optimization or semi-optimization and maintenance of the delivery schedule is then accomplished by the method of the present invention. The time a refiner has available within which to arrive at a feasible schedule is determined. The goals of the schedule are determined and the variables and constraints identified. A fitness function (discussed in more detail below) is then generated with the variables and constraints forming the terms of the fitness function. The goals influence the weightings applied to the terms of the problem specific fitness function. A first generation of chromosomes is randomly generated where each chromosome in the generation represents a possible solution. The fitness function value for each of the chromosomes is determined by evaluating the fitness function. A succeeding generation of chromosomes is then generated according to a genetic algorithm and the fitness function value for each of the chromosomes is again determined by evaluating the fitness function. The acts of generating a succeeding generation of chromosomes using a genetic algorithms and determining a fitness function value for each of the chromosomes in the succeeding generation is repeated as many times as possible within the specified time. The chromosome having the highest fitness function value within time T is then identified as the optimized or semi-optimized schedule.

As discussed above, frequently a refiner has a limited amount of time within which to devise a crude oil delivery schedule. A change in circumstances may drive a refiner to re-optimize or semi-optimize an existing schedule. For example, a vessel may be delayed by weather and will not be arriving on the date anticipated. The overall schedule may need to be reevaluated to account for this change. Changes in circumstances may be unpredictable and may leave the refiner with little time for re-evaluation of a delivery schedule. The present method operates within the time available to a refiner. The refiner establishes the amount of time available and the method identifies the best solution available within the set time frame. Note that the solution may not be a global solution, or in other words, a better solution may exist, but may not be identified within the time constraint. Of course, it is possible that the refiner may have no time pressure and the method may continue until a fully optimized schedule is identified.

A large number of goals and variable parameters may exist for a refiner when devising a schedule of crude oil deliveries. As discussed above, goals may include maximizing efficiency and or product value and minimizing costs. In different situations the importance of the different types of goals may vary. Similarly, a large number of variable parameters exist and are accounted for in scheduling deliveries of crude oil. Many of the variable parameters are discussed above, but many more are possible depending upon the particular circumstances.

In formulating the schedule of crude oil deliveries, there are a number of aspects that are fixed or that must be met. These are typically known as constraints. For example, the number of berths available for the vessels to moor at is generally a fixed number, and only one vessel may be moored at a mooring station at one time. For a solution of the genetic algorithm to be a feasible solution for the refiner, all of the constraints must be met. Other constraints include the size of the vessels delivering the crude oil, the amount of crude oil in each vessel and the type of crude oil in each vessel; the equipment available at each of the mooring stations such as the pump and line sizes, which determine the pump rate at which the crude oil may be unloaded; the storage facilities for the crude oil, and the available capacity of the storage facilities. The product quality of the refinery products is also a constraint, particularly in light of the different compositions of the incoming crude oils. Contaminate limits in the crude oil may also be a constraint.

The fitness function is an expression of the goals of the refiner, the variable parameters, and the constraints. It is a weighted sum of the various variable parameters and constraints that are to be considered in determining the crude oil delivery schedule. The specifics, such as the weightings and other factors, of the fitness function will change depending upon the particular circumstances of each refiner. For example, one refiner may have all the crude oil delivered by way of vessels while another takes deliveries by way of pipelines. Fitness functions for use in conjunction with genetic algorithms are known, and one of skill in the art would understand how to formulate the appropriate fitness function for a given application.

With the fitness function defined, the method of determining the schedule now incorporates a genetic algorithm to determine the optimum chromosome in the allotted time period. One benefit of using a genetic algorithm is the elimination of the need to determine every possible assignment sequence. A first generation of chromosomes is established by randomly generating a number of initial chromosomes. The fitness function value is then determined for each of the randomly generated chromosomes using the weighted factors. The genetic algorithm is then used to generate a succeeding generation of chromosomes and again the fitness function values are determined for each chromosome in the succeeding generation. The steps of using a genetic algorithm to generate succeeding generations of chromosomes and determining the fitness function values of each of the chromosomes are repeated as the predetermined time period will allow. If the time period is long enough, convergence may occur and an optimum solution may be identified. If the time period is not long enough for convergence, a semi-optimized solution may be identified at the end of the set time period as that chromosome that has the highest fitness function.

Referring to FIG. 1, the steps of the process of the invention are put forth. First, the time T, within which the crude oil shipment schedule is to be formed id determined. Then the goals of the crude oil shipment schedule, the variable parameters associated with the crude oil shipments to the refinery facility, and the constraints associated with the crude oil shipments to the refinery facility are all identified. The order of these steps is not important, so long as the goals, the variable parameters and the constraints are identified. A fitness function is created in accordance with the goals of the schedule, the variable parameters, and the constraints. Then, a first generation of chromosomes is randomly generated, where each chromosome in the generation representing a possible solution. The fitness function value for each of the chromosomes is calculated using the fitness function. A succeeding generation of chromosomes is created using a genetic algorithm and the fitness function value for each of the chromosomes is determined using the fitness function. The steps of producing a succeeding generation of chromosomes using a genetic algorithms and determining a fitness function value for each of the chromosomes in the succeeding generation are repeated so long as time T has not yet been reached. The chromosome having the highest fitness function value within time T is then identified.

What is claimed is:

1. A method of forming a schedule of crude oil shipments being received at a refinery facility comprising the steps of:
   a) determining a period of time, T, within which the crude oil shipment schedule is to be formed;
   b) identifying the goals of the crude oil shipment schedule;
   c) identifying the variable parameters associated with the crude oil shipments to the refinery facility;
   d) identifying the constraints associated with the crude oil shipments to the refinery facility;
   e) determining a fitness function in accordance with the goals of the schedule, the variable parameters and the constraints;
   f) randomly generating a first generation of chromosomes, each chromosome in the generation representing a possible solution;
   g) determining a fitness function value for each of the chromosomes using the fitness function;
   h) producing a succeeding generation of chromosomes using a genetic algorithm and determining a fitness function value for each of the chromosomes using the fitness function;
   i) repeating the acts of producing a succeeding generation of chromosomes using a genetic algorithms and determining a fitness function value for each of the chromosomes in the succeeding generation, and
   j) identifying the chromosome having the highest fitness function value within time T to form the schedule of crude oil shipments.

2. The method of claim 1 wherein the goals are selected from the group consisting of maximizing efficiency, maximizing product value, minimizing costs, or a combination thereof.

3. The method of claim 1 wherein the variable parameters are selected from the group consisting of which berth is selected, the amount of time for unloading the crude oil, the length of time to keep a vessel moored, which storage location to route the crude oil to, and combinations thereof.

4. The method of claim 1 wherein the constraints are selected from the group consisting of number of berths, size of the vessels, amount of crude oil in the vessel, type of crude oil in the vessel, equipment available at each mooring site, the storage facilities available, the product quality of the refinery product, contaminate limits in the crude oil, demurrage charges associated with a vessel, and combinations thereof.

* * * * *